United States Patent
Martin et al.

(10) Patent No.: US 9,244,651 B2
(45) Date of Patent: Jan. 26, 2016

(54) DOCUMENT REVISION CONTROL

(75) Inventors: Mikel Le Martin, Chelsea, MI (US); Mark Jeffrey Kidder, Howell, MI (US); Michael Chase, Madison Heights, MI (US); Peter Hodgman, Dexter, MI (US); Kenneth Alexander Vadella, West Bloomfield, MI (US); Patrick Francis Cataldo, New Hudson, MI (US)

(73) Assignee: AUTODESK, INC., San Rafael, CA (US)

( * ) Notice: Subject to any disclaimer, the term of this patent is extended or adjusted under 35 U.S.C. 154(b) by 636 days.

(21) Appl. No.: 13/039,205

(22) Filed: Mar. 2, 2011

(65) Prior Publication Data

US 2011/0218979 A1    Sep. 8, 2011

Related U.S. Application Data

(60) Provisional application No. 61/310,659, filed on Mar. 4, 2010.

(51) Int. Cl.
*G06F 17/30* (2006.01)
*G06F 7/00* (2006.01)
*G06F 17/00* (2006.01)

(52) U.S. Cl.
CPC . *G06F 7/00* (2013.01); *G06F 17/00* (2013.01)

(58) Field of Classification Search
None
See application file for complete search history.

(56) References Cited

U.S. PATENT DOCUMENTS

| | | | | |
|---|---|---|---|---|
| 6,035,297 A | * | 3/2000 | Van Huben | G06F 17/30557 707/695 |
| 6,430,455 B1 | * | 8/2002 | Rebello et al. | 700/105 |
| 2004/0133444 A1 | * | 7/2004 | Defaix et al. | 705/1 |
| 2006/0248450 A1 | * | 11/2006 | Wittenberg | G06F 8/00 715/209 |
| 2006/0282477 A1 | * | 12/2006 | Gruidl et al. | 707/201 |
| 2009/0217302 A1 | * | 8/2009 | Grechanik | G06F 8/70 719/320 |
| 2015/0199414 A1 | * | 7/2015 | Braginsky | G06F 17/30578 707/613 |

* cited by examiner

*Primary Examiner* — Wilson Lee
(74) *Attorney, Agent, or Firm* — Artegis Law Group, LLP

(57) ABSTRACT

A method for managing document revisions. The method includes receiving a request to access a parent file stored on a server, where the parent file is associated with one or more child files; determining whether a first option is enabled that is associated with selecting a latest version or revision of a child file, where a revision includes one or more versions; determining whether a second option is enabled, where the second option is associated with selecting a released version or revision of a child file; and, for each child file, providing access to a version or revision of the child file based on whether the first option is enabled and whether the second option is enabled.

20 Claims, 10 Drawing Sheets

DOCUMENT REVISION CONTROL

CROSS-REFERENCE TO RELATED APPLICATIONS

This application claims benefit of U.S. provisional patent application Ser. No. 61/310,659, filed on Mar. 4, 2010, which is hereby incorporated by reference herein.

BACKGROUND

1. Field of the Invention

Embodiments of the invention relate generally to systems and methods for document revision control.

2. Description of the Related Art

Within conventional design environments, a part that belongs to an assembly is often assigned a revision number. When the part is modified, design standards dictate that the modified version of the part be assigned a new revision number, such as the next sequential revision number. When an assembly is opened that includes a reference to the part, the design application prompts the user that a new revision for the part is available and asks the user whether the current version of the part should be loaded or whether the previous version should be loaded. However, the user may not be privy to the changes that were made to the part and may not be sure as to which revision of the part should be loaded in the assembly. For example, a particular assembly may be dependent on the previous revision of the part and is not operable using the current revision. The complications associated with multiple revisions of parts described above provide for inefficient workflow and a cumbersome user experience.

As the foregoing illustrates, there is a need in the art for an improved technique for the management of document revisions.

SUMMARY

One embodiment of the invention provides a method for managing document revisions. The method includes receiving a request to access a parent file stored on a server, where the parent file is associated with one or more child files; determining whether a first option is enabled that is associated with selecting a latest version or revision of a child file, where a revision includes one or more versions; determining whether a second option is enabled, where the second option is associated with selecting a released version or revision of a child file; and, for each child file, providing access to a version or revision of the child file based on whether the first option is enabled and whether the second option is enabled.

DETAILED DESCRIPTION

Embodiments of the invention provide a document revision management system that is very flexible, relative to prior art techniques. The user can choose to use revisions without using lifecycles, or can use revisions in conjunction with using lifecycles. A given revision of a component may be edited and released without knowledge of the context of any referencing assemblies, and the released changes are used when the assembly is opened. Additionally, the user can choose to set the Released Biased option to ON or OFF depending on the particular needs at a given time.

System Architecture

Figure 1A:
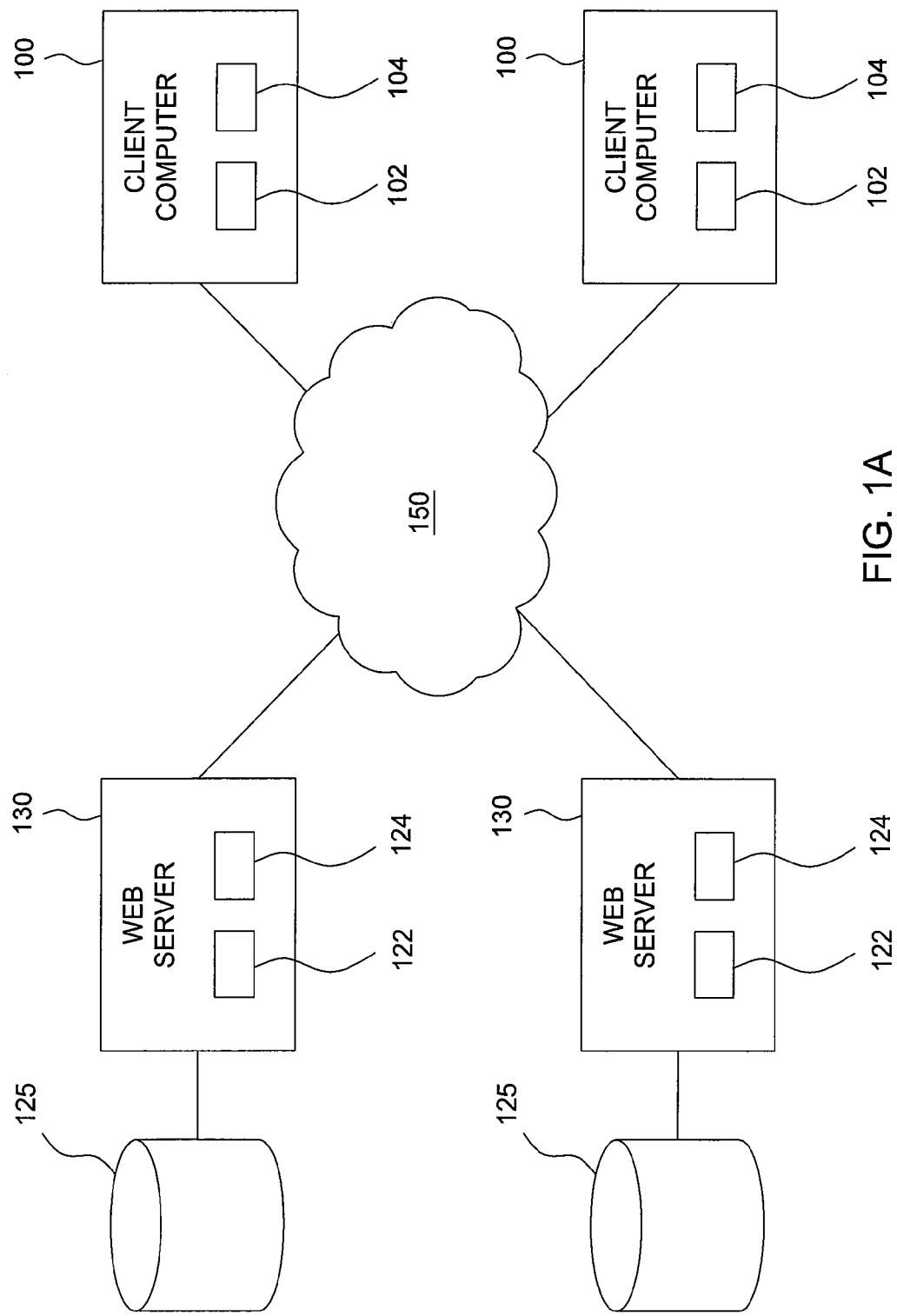
FIGS. 1A-1B are block diagrams of systems configured to implement one or more aspects of the invention.

FIG. 1A illustrates a networked computer environment in which embodiments of the invention may be practiced. As shown, the networked computer environment includes a plurality of client computers 100 (only two of which are shown) and a plurality of web servers 130 with associated content storage units 125. The client computers 100 and the web server computers 130 are connected over a computer network 150, e.g., the Internet.

Each client computer 100 includes conventional components of a computing device, e.g., a processor 102, system memory 104, a hard disk drive, input devices such as a mouse and a keyboard, and output devices such as a monitor, among others. Each web server 130 includes a processor 122 and a system memory 124, and manages the contents stored in its respective content storage unit using a relational database software. The web server is programmed to communicate with the client computers 110 and other web servers using the TCP/IP protocol. The client computers 110 are programmed to execute web browser programs and other software applications and access the web pages and/or applications managed by the web servers by specifying a uniform resource locator (URL) for the web server into the browser.

In the embodiments of the present invention described below, users are respectively operating the client computers 100 that are connected to the web servers 130 over the Internet. The web pages and/or applications and/or files that are displayed and/or transmitted to a user are displayed/transmitted from the web servers 130 to that user's client computer 100 and processed by a web browser program and/or a software application stored in that user's client computer 100 for display through the monitor of that user's client computer 100.

Client computers 100 may comprise a personal computer, smart phone, touch pad, touch screen, or any other device suitable for practicing one or more embodiments of the present invention. It should be noted that the present invention can be implemented in hardware, software, or in a combination of hardware and software, e.g., using application specific integrated circuits (ASIC), a general purpose computer or any other hardware equivalents.

Figure 1B:
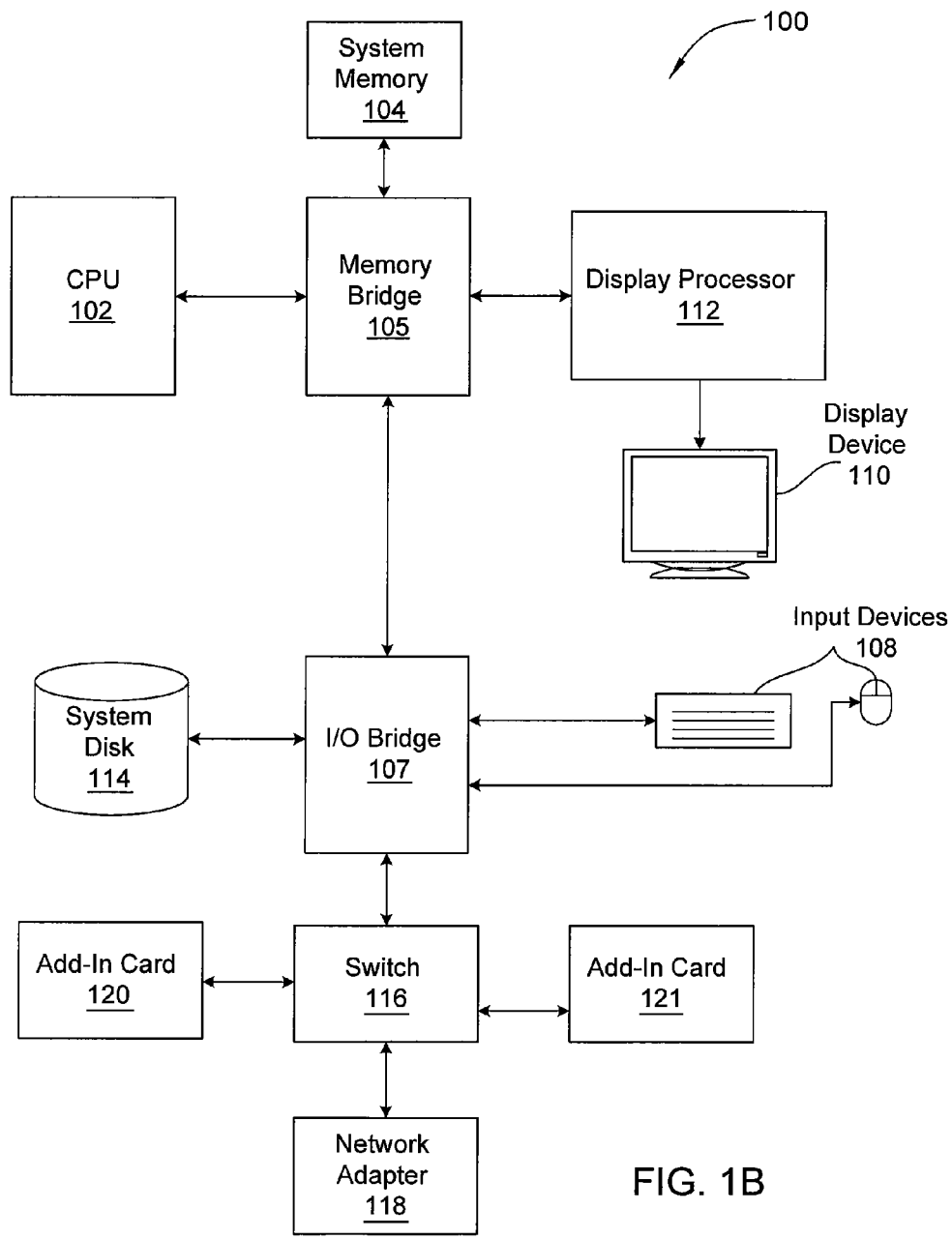

FIG. 1B is a block diagram of a computer system 100 configured to implement one or more aspects of the invention. The system architecture depicted in FIG. 1B in no way limits or is intended to limit the scope of embodiments of the invention. Computer system 100 may be a computer workstation, personal computer, video game console, personal digital assistant, rendering engine, or any other device suitable for practicing one or more embodiments of the invention.

As shown, computer system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105. In some embodiments, input/output devices may include a radio frequency identification (RFID) tag and/or RFID reader. Additionally, any other technically feasible technique for implementing user identification is within the scope of embodiments of the invention.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal. According to various embodiments, the CPU 102 and/or the display processor 112 is configured to execute a graphics design application, such as a computer-aided design (CAD) application.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1B may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Document Revision Control

Embodiments of the invention provide a collaborative software environment that helps design teams easily create and share digital prototyping information by securely organizing, managing, and tracking data from a central location. Design teams can administer access and control, allowing team-based development across disciplines. Team-based collaboration helps users gain productivity without disruption to their natural design workflows. Various embodiments of the invention provide revision and lifecycle control processes directly in the design application, which can result in faster cycle times and better-quality engineering data.

According to various embodiments, when editing documents in a collaborative software environment, the changes to a file can be saved as version history on a server. However, at times the version history has little information that can be used to identify significant events or changes to the file. Therefore, the engineering industry has come up with standards used for labeling significant changes to data. This is typically called the document revision. However, complications associated with multiple revisions of documents provide for an inefficient workflow and cumbersome user experience.

Embodiments of the invention provide the ability to mark a point in time as a significant change to a document and its related files. A revision level of a document may be retrieved along with the correct revision level of any related documents. When used in combination with lifecycles, a revision level is created automatically during predefined events. The revision will also be marked as "Released" when the document is placed into certain lifecycle states identified as released states. During open and download procedures, the user may choose to retrieve released or non-released revisions of the document and its related files.

A "revision," as used herein, refers to a collection of file versions. After a revision is created, document edits are contained within that revision until a new revision is created. Therefore, in some embodiments, as changes are made and committed to the system, the user sees no change to the revision label.

For example, a document can be created and assigned the revision level "A". As the user makes changes and those versions are saved to the server, the revision label remains "A". Only when the user performs a revision incrementing action is a new revision created. Performing a revision incrementing action causes a new revision of the document to be created with the label "B". Any subsequent edits would then be collected within revision "B".

Once the revision objects have been created and saved to a server, any revision or version within a revision can be downloaded or opened from the server. When a revision is downloaded, only one version within that revision is used to represent the revision. In some embodiments, where lifecycles are not used, the version that is downloaded or opened is the latest version within that revision. In other embodiments, different versions or revisions can be downloaded or opened, as described in greater detail herein.

According to various embodiments, when using documents that are related to each other, such as computer-aided design (CAD) assemblies and referenced components, a relationship is created between the specific revisions of those documents. For example, when an assembly is saved to the server, the revision of each of the components of the assembly is recorded for future use. When that particular revision of the assembly is opened or downloaded, each related document can be retrieved using the revision that was recorded when the assembly was saved.

As used herein, a "version" of a document corresponds to an iteration of a document and its meta-data that is created whenever a modification is saved to the server. A "revision" refers to a collection of versions with a common label representing the work done to complete a desired change. A "lifecycle definition" refers to a defined set of lifecycle states and transition rules that may be assigned to a document. A "lifecycle state" refers to a predefined stage describing the current status of the document. A document is "released" when an attribute is assigned to a version that gives priority status to that version. When opening or downloading a document in "released biased" mode, the system favors released data over non-released data.

As described, in some embodiments, a "revision" can be represented by the latest version within that revision. This rule applies when related documents are downloaded, and any out-of-context changes that are made to the revision of the related documents are consumed by the referencing document. As example is described below.

Figure 2A:
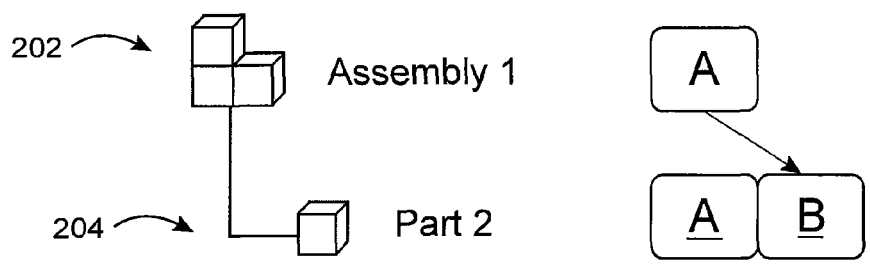
FIGS. 2A-2C are conceptual diagrams of an assembly that includes a part, according to embodiments of the invention.

FIG. 2A is a conceptual diagram of an assembly 202 that includes a part 204, according to one embodiment of the invention. As shown, revision "A" of the assembly 202 references revision "B" of the part 204. If edits are made to revision "B" of the part 204 after the assembly 202 has been checked in, the changes to revision "B" of the part are shown in the assembly 202 when revision "A" of the assembly 202 is opened.

Figure 2B:
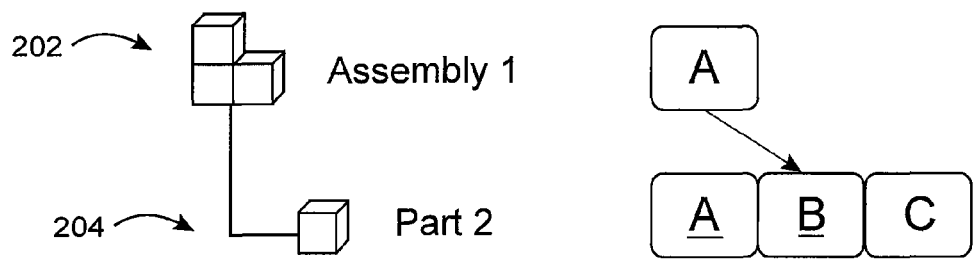

Also, if a new revision of a referenced document is created and then the edits are made, those changes will not be shown when a specific revision of the referencing document is opened. FIG. 2B is a conceptual diagram of the assembly 202 that includes another revision of the part 204, according to one embodiment of the invention. As shown, revision "A" of the assembly 202 references revision "B" of the part 204. A new revision of the part 204 is created, named revision "C," and then edits are made to revision "C" of the part 204. When revision "A" of the assembly 202 is opened, the changes to revision "C" of the part will not be shown in the assembly 202.

Accordingly, embodiments of the invention add flexibility to the revision management system. Embodiments allow revision edits to be consumed by referencing documents without the need to modify the referencing documents. At the same time, embodiments allow edits of components to not affect historical data, if so desired.

According to various embodiments, a lifecycle is comprised of various lifecycle states that can be assigned to a file. One or more of the lifecycle states may be identified as a "released state." When a file is in a released state, a new version is created that is marked internally as released. Newer, but non-released, versions can be created by moving the document to a different state without creating a new revision.

For example, a document can be in a released state and then is moved to a "quick change" state, which is not a released state. A released version of the document is created, followed by a non-released version within the same revision.

Marking a version as released can have several effects. For example, in some implementations, a released version of the file can never be purged from the system and/or can only be deleted by an administrator. Also, in some implementations, the released version has priority over all versions within that revision, even if newer versions are created.

When a user is opening or downloading a file, the user can be presented with several options that determine which version and/or revision of the file should be retrieved from the server. One such option may be a "Latest" option, which selects the most recent revision and/or version of the file. In some embodiments, the user is also provided with a "Released Biased" option. The Released Biased option allows the user to set a preference for released or non-released data. There are several reasons why a user would want one over the other. For example, the choice may be dependent on whether the user is planning to edit or simply "consume" the documents, i.e., use as "read-only." The system determines which revision to choose based on the Released Biased when a choice is available between new data and released data. If the Released Biased option is set to ON, then the released data is chosen. If the option is OFF, then the newest, and sometimes not released, data is chosen.

Figure 2C:
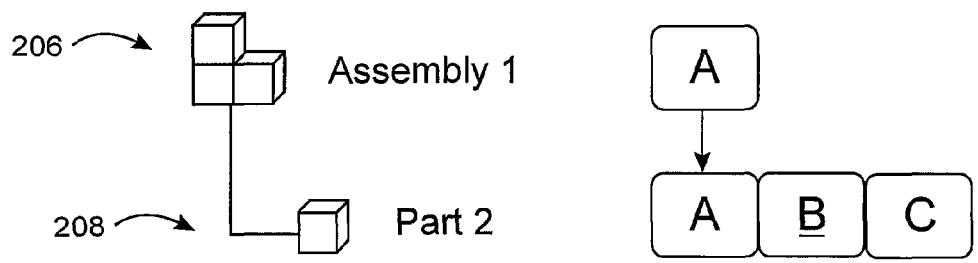

FIG. 2C is a conceptual diagram of an assembly 206 that references part 208, according to one embodiment of the invention. As shown, the assembly 206 has only one revision, revision A. The part 208 has three revisions, and only revision B is released. In one embodiment, a revision is denoted with an underline below the revision letter. In other embodiments, other notations can be used to denote a revision, such as a different color, an icon or symbol, or a highlight.

In a first scenario, if the user chooses to open assembly 206 using the "Latest" option with the Released Biased option set to OFF, the assembly 206 is opened referencing revision "C" of part 208. In a second scenario, if the user chooses to open assembly 206 using the Latest option with Released Biased option set to ON, then assembly 206 is opened referencing revision "B" of part 208, since revision B is the latest released version. The difference between the first and second scenarios is that the Released Biased option is set to ON in the second scenario. By selecting the Latest option, the system chooses between the latest revision and the latest released revision based on whether the Released Biased option is set to ON.

In yet another scenario, the user chooses to open assembly 206 and specifically chooses revision "A" of the assembly 206 (instead of selecting the Latest option) with the Released Biased option ON. The assembly 206 is opened referencing revision "A" of the part 208. The reason that in this scenario the system uses revision "A" of the part even though revision A is not released is because there is no choice to be made since the user specifically requested revision A. Therefore, the Released Biased option has no effect. In one embodiment, when the user requests a specific revision of a document, the system uses the corresponding revision of the related documents, regardless of whether the revision is released and regardless of whether the Released Biased option is set to ON.

In some embodiments, the same logic that is applied to selecting revisions also applies to selecting versions within the revisions. For example, if the revision has a released version and a newer version that is not released, then the 'Released Biased' option determines which version is given priority.

As described above, a "version" of a document corresponds to an iteration of a document and its meta-data that is created whenever a modification is committed to the system. Examples of modifications include editing the file in the CAD application, editing properties, or simply moving files, among others. A "revision" can include multiple versions. In some embodiments, the user only sees the revision container and not the versions inside. When a file is modified and new versions are created, the new versions are placed within the leading revision.

Figure 3A:
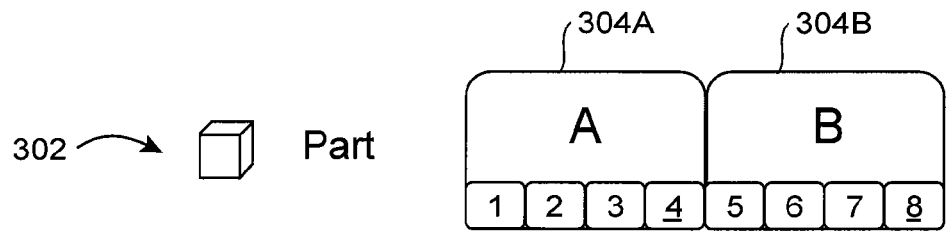
FIGS. 3A-3C are conceptual diagrams of a part associated with multiple revisions and multiple versions, according to embodiments of the invention.
Figure 3B:
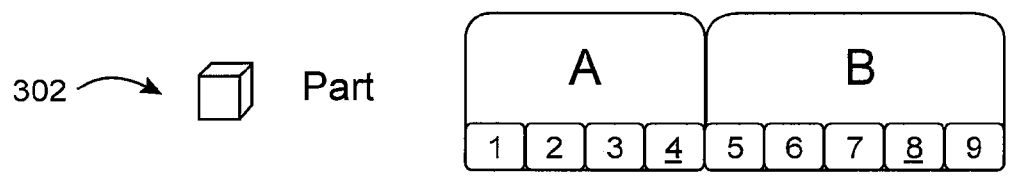
Figure 3C:
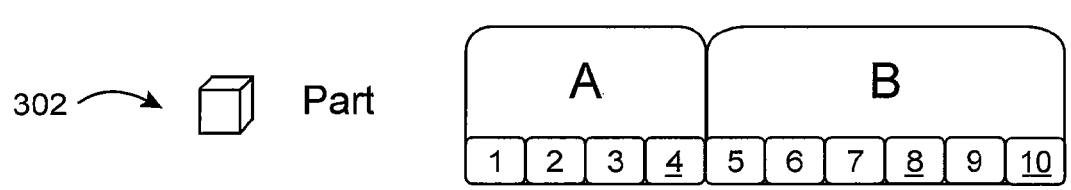

FIGS. 3A-3C are conceptual diagrams of a part 302 associated with multiple revisions and multiple versions, according to embodiments of the invention. As shown in FIG. 3A, the part 302 includes two revisions 304A, 304B. Revision 304A includes four versions: version A1, version A2, version A3, and version A4. Revision 304B includes four versions: version B5, version B6, version B7, and version B8.

When using lifecycles, certain versions of the document may be marked a "released," as described above. Released versions are denoted with an underline. As shown in FIG. 3A, version A4 and version B8 are released.

Additional versions, which are not released, can be added to a revision. This type of change is commonly referred to as a "quick change." FIG. 3B is a conceptual diagram illustrating a version within a revision that has been created after the released version, according to one embodiment of the invention. As shown, versions B9 is added to revision B. Version B9 is not released, whereas version B8 is released, as indicated by the underline of version B8. Thus, the released version B8 is not the leading version.

According to various embodiments, the user can open or download either version B8 or version B9 based on various settings. For example, if Revision B is referenced by another document and the Released Biased option is turned ON, then the released version B8 would be used. If, however, the Released Biased option is turned OFF, then the leading version B9 is used.

If revision B is then released a second time, the newly released version would be the version that is returned when referencing the revision. FIG. 3C is a conceptual diagram illustrating two released versions within a revision, according to one embodiment of the invention. As shown, revision B is released a second time at version B10. Both version B8 and version B10 are released. Thus, the newly released version B10 would be the version that is returned when referencing the revision when the Released Biased option is turned ON and when the Released Biased option is turned OFF.

In sum, embodiments of the invention provide a document revision management system that is very flexible, relative to prior art techniques. The user can choose to use revisions without using lifecycles, or can use revisions in conjunction with using lifecycles. A given revision of a component may be edited and released without knowledge of the context of any referencing assemblies, and the released changes are used when the assembly is opened. Additionally, the user can choose to set the Released Biased option to ON or OFF depending on the particular needs at a given time.

Figure 4:
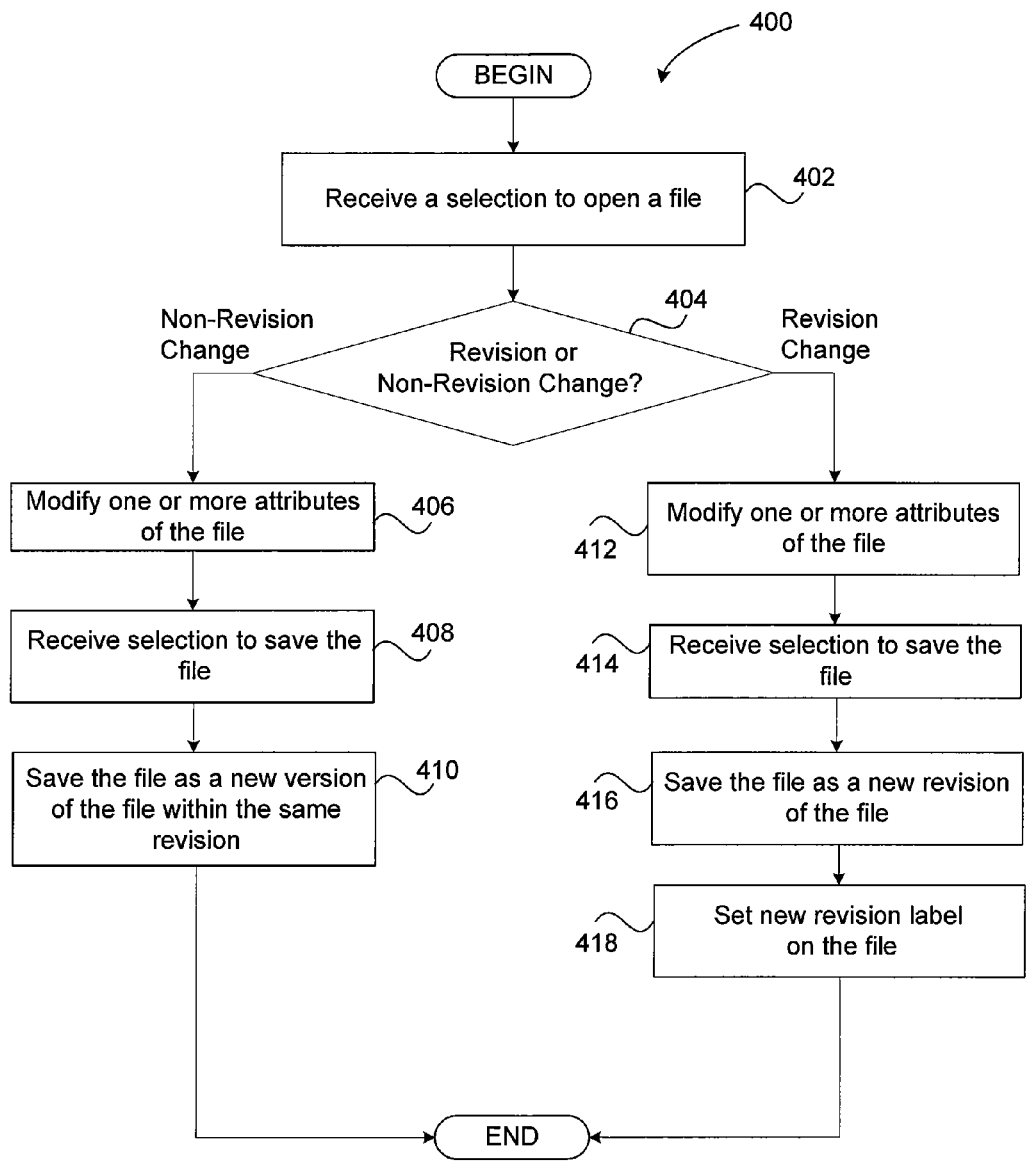
FIG. 4 is a flow diagram of method steps for modifying and saving a file, according to one embodiment of the invention.

FIG. 4 is a flow diagram of method steps for modifying and saving a file, according to one embodiment of the invention. Persons skilled in the art will understand that, even though the method 400 is described in conjunction with the system of FIGS. 1A-1B, any system configured to perform the method steps, in any order, is within the scope of embodiments of the invention.

As shown, the method 400 begins at step 402, where a software application, such as a CAD application executed by a processor, opens a file. For example, the file may be a CAD file, as assembly file, a sub-assembly file, a part file, or any other type of file. In some examples, the file defines a particular component that may be included in one or more assembly files and contributes to the overall structure and design of the one or more assembly files. For example, a part file can be defined by a set of attributes that specify the part file to be a screw that is one inch long, one quarter inch in diameter, includes a Phillips screw driver head, and includes twenty threads. The part file may be stored in a parts library that is accessible by computer-aided design (CAD) software such as AutoCAD® provided by Autodesk®. In some embodiments, the parts library is stored on a server accessible by the software application. The software application allows the user to create, modify, or delete attributes that are associated with the file.

At step 404, the software application determines whether the user desires to make a revision change or a non-revision change to the file. A minor modification that does not significantly affect the overall structure of the part is usually not given a new revision. For example, consider an assembly that requires eight instances of a screw part to fasten two curved panels to one another. Each of the curved panels includes eight holes that are in alignment with the eight holes of the other curved panel when the two curved panels are joined together. Modifying the head of the screw part to be a flat, non-Phillips screw head may not significantly affect the overall assembly since the two curved panels may still be fastened together using the modified screws. Therefore, in this example, the modification of the screw head comprises a non-revision modification. Another example of a non-revision modification includes modifying the material of the screw, which would likely not affect the compatibility with the holes included in the two curved panels.

According to various embodiments, a "revision" change to a part file is a modification that considerably affects the overall structure of an assembly that includes the part file. Using the same example above, modifying the diameter of the screw and the number of threads in the screw may require that the holes in each of the two curved panels be modified to be compatible with the modified screw. Such a modification is likely considered a "major" modification; thus, the modification may be considered to require a new revision of the part file. Another example of a revision modification includes increasing the length of the screw.

In one embodiment, the user making the modification manually indicates whether the modification requires a new revision. For example, the user can indicate what type of change (i.e., revision change or non-revision change) to make to the file by selecting a user interface element, such as a button, in a graphical user interface (GUI) associated with the software application.

In alternative embodiments, the type of modification performed on the part file, i.e., whether the modification is a revision change or a non-revision change, is automatically determined by the software application and is not required to be manually defined by the user. For example, the software application may be configured to parse a list attributes associated with the part file being modified. The list may include one or more attributes, where each attribute is defined as a non-revision attribute or a revision attribute. Accordingly, when an attribute of the part file is modified, the software application may determine what type of attribute is modified and correspondingly associate the modification as requiring a new revision or not. In one embodiment, when any attribute that is defined as a revision attribute is modified, the modification is automatically deemed a revision change.

At step 406, the software application receives user input that modifies one or more attributes of the file. For example, the user may cause the software application to modify the head of the screw to be a flat, non-Phillips screw driver head, thereby reducing the cost of the screw. In another example, the user modifies the screw to be made of a different material, so that the modified screw provides better overall strength when used to fasten components together in a particular assembly.

At step 408, the software application receives a selection to save the updated file. For example, the user can select a "Save" button from a drop-down menu. At step 412, the software application saves the file as a new version of the file within the same revision on the server. Additionally, the user can "release" the newly saved version. In some embodiments, releasing a file indicates that the file has been authenticated and authorized for consumption by other users, e.g., by a manager or administrator.

Referring back to step 404, if the software application determines that the file change is a revision change, then the method 400 proceeds to step 412. At step 412, the software application receives user input that modifies one or more attributes of the file, and, at step 414, the software application receives a selection to save the updated file. In one embodiment, steps 412 and 414 are substantially similar to steps 406 and 408, described above.

At step 416, the software application saves the file as a new revision of the file. At step 418, the software application sets a new revision label on file. For example, a revision number or a revision letter of the file may be incremented.

Figure 5:
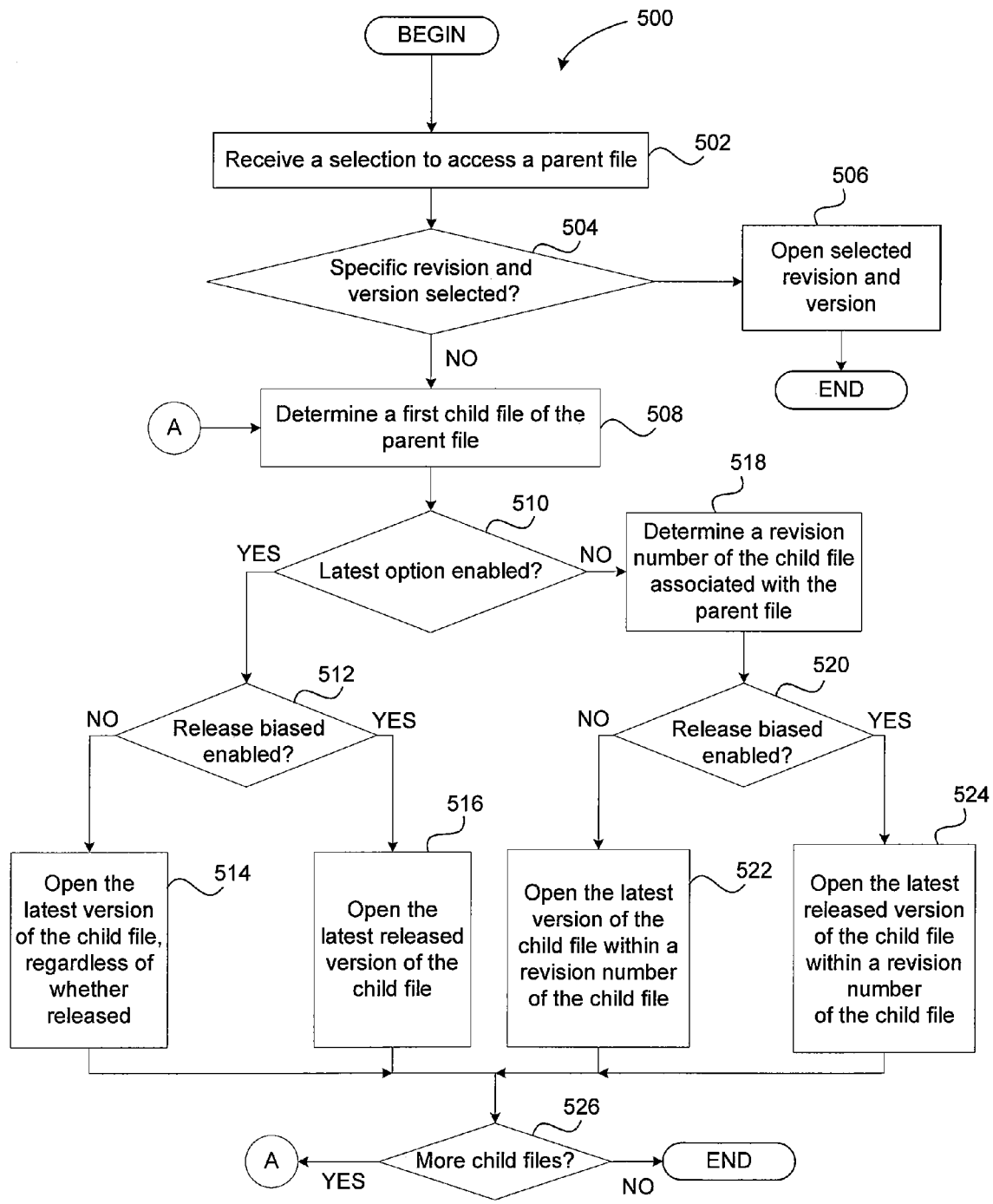
FIG. 5 is a flow diagram of method steps for accessing a file, according to one embodiment of the invention.

FIG. 5 is a flow diagram of method steps for accessing a file, according to one embodiment of the invention. Persons skilled in the art will understand that, even though the method 500 is described in conjunction with the system of FIGS. 1A-1B, any system configured to perform the method steps, in any order, is within the scope of embodiments of the invention.

As shown, the method 500 begins at step 502, where a software application, such as a CAD application executed by a processor, receives a selection to access a parent file. Accessing the parent file can include opening and/or downloading the parent file. The parent file can be a CAD file, an assembly file, a sub-assembly file, a part file, or any other type of file. The part file can include "child files," each of which can further include child files. An example of a parent file is an assembly file that includes parts, each part being associated with a child file.

At step 504, the software application determines whether a specific revision and version of the parent file are selected to be opened. If a specific revision and version of the parent file are selected to be opened, then the method 500 proceeds to step 506. At step 506, the software application opens and/or downloads the selected revision and version of the parent file. In some embodiments, when the user specifies which version and/or revision of the file to access, then that specific revision and version are accessed, regardless of whether newer or different revisions and/or versions are available.

If, at step 504, a specific revision and version of the parent file are not selected to be opened, then the method 500 proceeds to step 508. At step 508, the software application determines a first child file of the parent file. For example, when the parent file is an assembly file, child files of the parent file may include sub-assembly files and/or part files.

At step 510, the software application determines whether the "Latest" option is enabled. If the software application determines that the Latest option is enabled, then the method 500 proceeds to step 512, where the software application determines whether the Release Biased option is enabled. If the software application determines that the Release Biased option is not enabled, then the method 500 proceeds to step 514. At step 514, the software application opens or downloads the latest version of the child file, regardless of whether the latest version has been released.

If, at step 512, the software application determines that the Release Biased option is enabled, then the method 500 proceeds to step 516. At step 516, the software application opens or downloads the latest released version of the child file.

If, at step 510, the software application determines that the Latest option is not enabled, then the method 500 proceeds to step 518, where the software application determines a revision number of the child file associated with the parent file. In some embodiments, a revision number is associated with each child file associated with the parent file. At step 520, the software application determines whether the Release Biased option is enabled. If, at step 520, the software application determines that the Release Biased option is not enabled, then the method 500 proceeds to step 522. At step 522, the software application opens or downloads the latest version of the child file within a revision number of the child file.

If, at step 520, the software application determines that the Release Biased option is enabled, then the method 500 proceeds to step 524. At step 524, the software application opens or downloads the latest released version of the child file within a revision number of the child file.

In some embodiments, when the revision or version accessed is not the latest revision or version, the software application can display an indication that the accessed revision or version is not the latest revision or version of the file. For example, an icon, such as an exclamation point icon, may be displayed adjacent to the child file in a hierarchy of files associated with the parent file, indicating that a more recent revision of the child file is available and may be accessible by the software application. The user may choose to load the more recent revision of the child file. According to various embodiments, displaying the indication may be optional.

At step 526, the software application determines whether more child files are associated with the parent left to analyze. If so, then the method 500 returns to step 508. The method 500 recursively walks though each child file of the parent file to determine which version and/or revision of the child file should be opened and/or downloaded. If, at step 526, the software application determines that no more child files are associated with the parent left to analyze, then the method 500 terminates.

Example Workflow

Figure 6A:
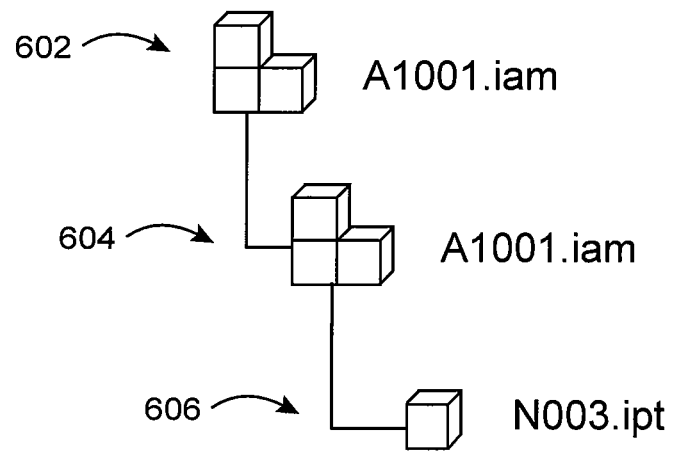
FIGS. 6A-6H are conceptual diagrams that illustrate revision management of an assembly, according to various embodiments of the invention.

FIGS. 6A-6H are conceptual diagrams that illustrate revision management of an assembly, according to various embodiments of the invention. In one example, the user can start out by creating a new assembly named "A1001.iam," which includes a sub-assembly named "S002.iam." The user then creates a new part called "N003.ipt" and places the part into the sub-assembly. FIG. 6A shows a data structure of the assembly 602. As shown, the assembly 602 includes sub-assembly 604, which includes part 606.

The user can then check-in/save the new assembly 602 into the server that is configured to implement a document revision scheme described herein. In one embodiment, the server is configured to automatically assign revisions and manage lifecycles. For example, the software application can set all of the new data to a revision letter and place the new data into the "Work in Progress" state.

Figure 6B:
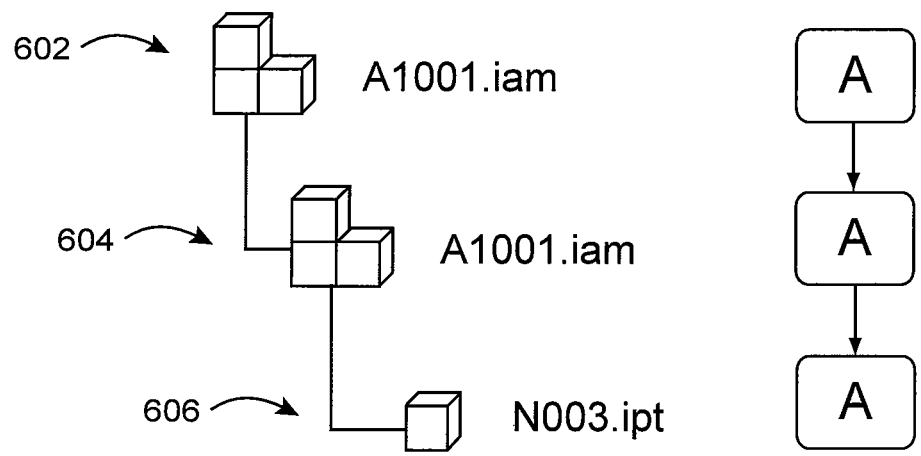

FIG. 6B illustrates a conceptual diagram of a data model with the new revisions for the assembly 602 and the relationships to each other, according to one embodiment of the invention. As shown, each of assembly 602, sub-assembly 604, and part 606 are assigned a revision "A".

The user would then like to add an already-existing part, "X004.ipt," to the assembly 602. The user would like to insert the latest released revision of the component. To do so, the user can set the software application so that the "Latest" option is enabled and that the "Released Biased" option is also enabled.

Figure 6C:
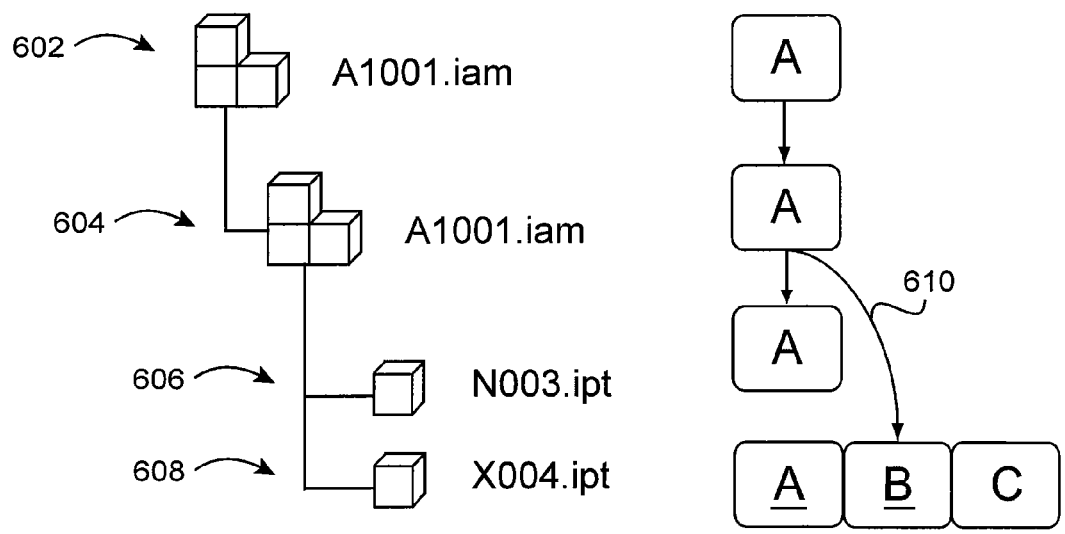

As shown in FIG. 6C, part 608 is added to the sub-assembly 604. Part 608 includes several revisions in its history, including revisions A, B, and C. Revisions A and B have been released (indicted by the underline below the revision letter), whereas revision C has not been released (indicated by no underline). When the "Latest" option is enabled and the "Release Biased" option is enabled, revision B of part 608 is used, indicated by arrow 610.

After closing the assembly 602, e.g., to work on some other designs, the user then wants to reopen the assembly 602. As described below, there are several different results that the user could get when opening the assembly 602, depending on the options that the user chooses.

As described, the user can set the "Latest" option and/or the "Release Biased" option to be enabled. When the Latest and the Released Biased option are both enabled, then this setting would return revision B of part 608. This is because revision B is the latest released revision; revision C is not released. When the Latest option is enabled and the Released Biased option is disabled, then this setting would return revision C of part 608.

Figure 6D:
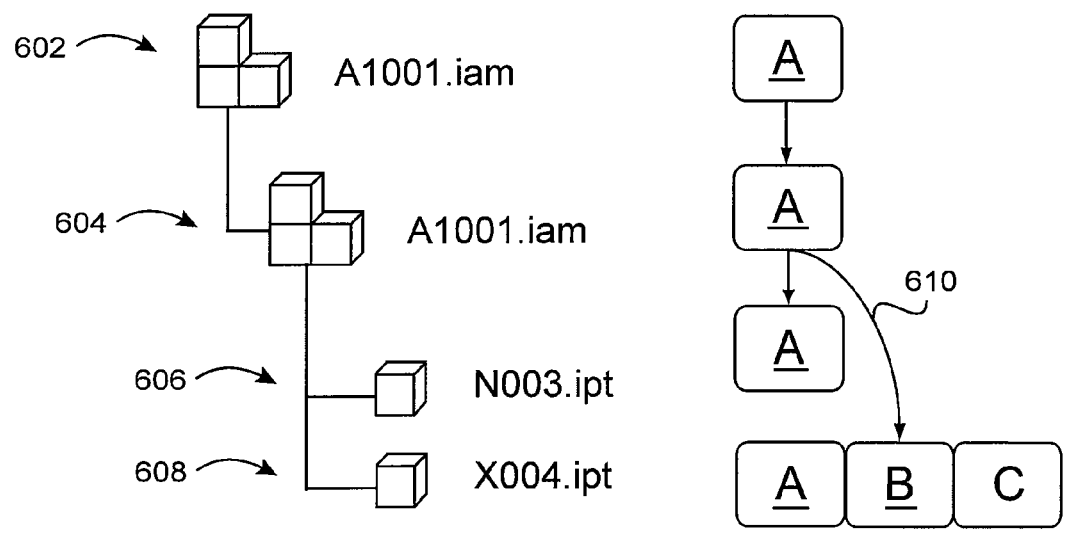

Continuing on with the example, suppose the user releases all of the components. As shown in FIG. 6D, each of assembly 602, sub-assembly 604, and part 606 are now shown with an underline below the revision letter, i.e., revision A for each of assembly 602, sub-assembly 604, and part 606.

Figure 6E:
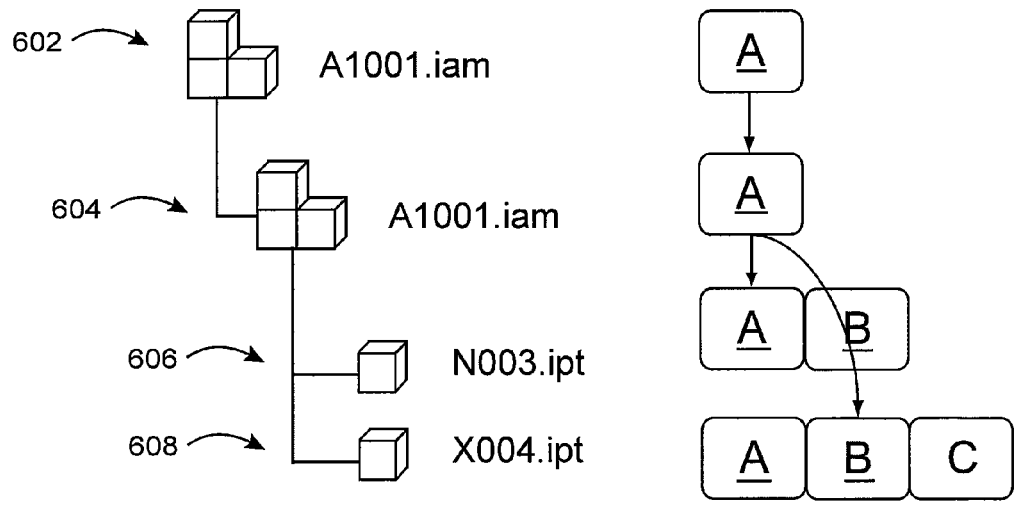

After releasing the components, the user discovers that a change is needed in the part 606. The user changes the state of the part 606 to 'Work in Progress." This change causes a new revision, revision B, of the part 606 to be created, as shown in FIG. 6E. The user opens the file for part 606 and makes the changes required. The user then releases revision B of the part 606, as indicated by the underline below revision B of part 606 in FIG. 6E.

Figure 6F:
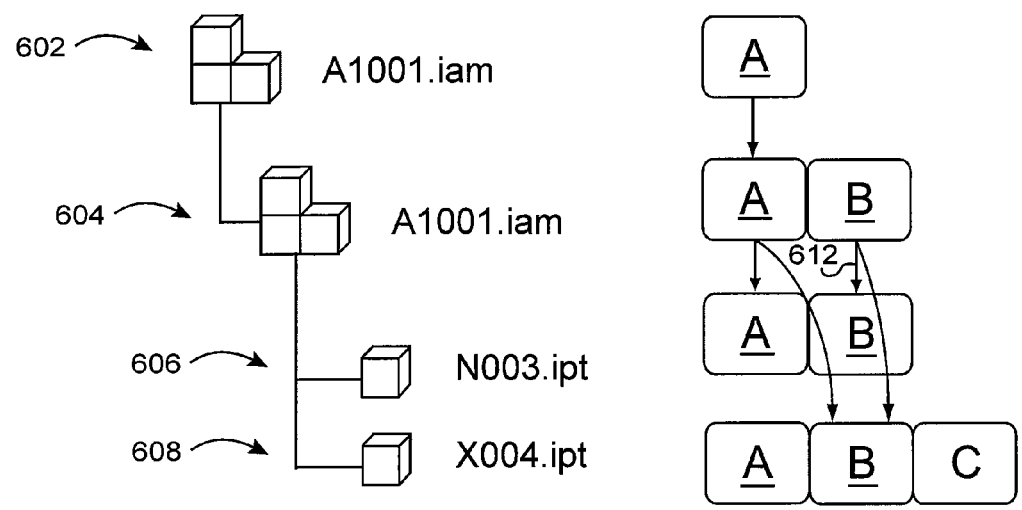

The user then wants to change the sub-assembly 604 to use the new revision (revision B) of part 606. The user changes the sub-assembly 604 to a "Work in Progress" state, causing a new revision (revision B) of the sub-assembly 604 to be created, as shown in FIG. 6F. The user then updates the sub-assembly 604 to use revision B of part 606, as shown in FIG. 6F by arrow 612.

Figure 6G:
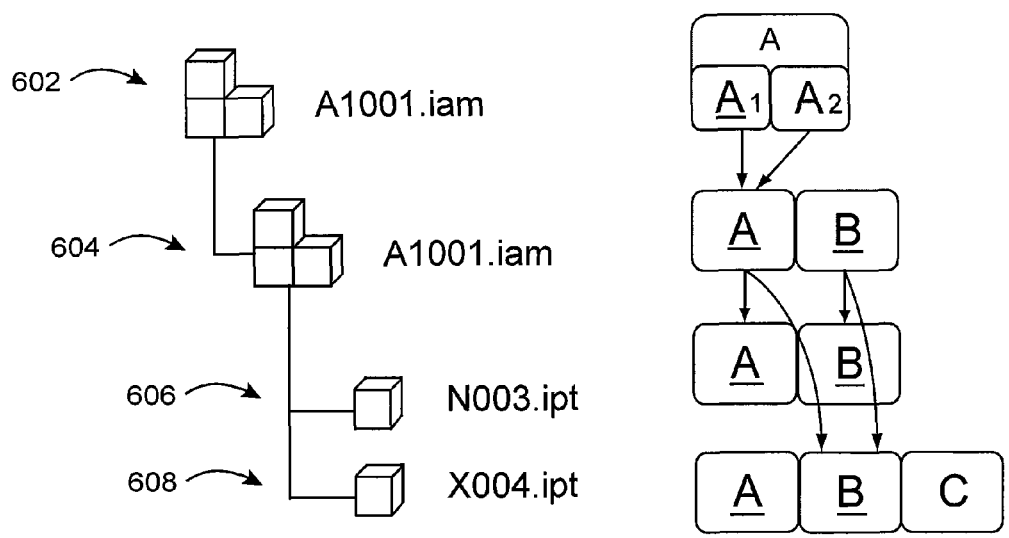

After creating revision B of the sub-assembly 604, the user decides that the main assembly 602 should consume the change to the sub-assembly 604 without creating a new revision of the main assembly 602. To do this, the user changes the state of the assembly 602 to a "Quick Change" state, which allows the user to edit the assembly 602 without creating a new revision letter. This creates a secondary version of revision A, as shown in FIG. 6G, which shows the Released version A1 and the Quick Change version A2. If the assembly 602 were being referenced by another file, the released biased option would determine whether the Released (version A1) or Quick Change version (version A2) should be returned.

Figure 6H:
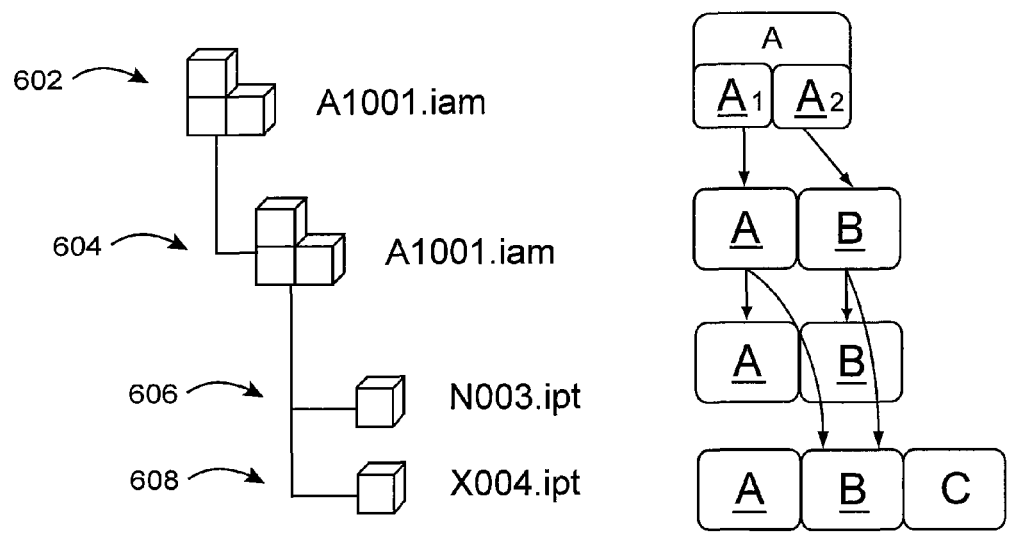

The user can then edit revision A of assembly 602 to use revision B of sub-assembly 604 and change the state of assembly 602 to Released. This means that revision A has been released twice, as shown in FIG. 6H. This causes the newly released version A2 of revision A to replace the old released version of revision A (i.e., version A1). The history of the assembly 602 can continue to show two released versions of revision A.

In sum, embodiments of the invention provide a document revision management system that is very flexible, relative to prior art techniques. The user can choose to use revisions without using lifecycles, or can use revisions in conjunction with using lifecycles. A given revision of a component may be edited and released without knowledge of the context of any referencing assemblies, and the released changes are used when the assembly is opened. Additionally, the user can choose to set the Released Biased option to ON or OFF depending on the particular needs at a given time.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A method for managing document revisions, comprising:
receiving a request to access a parent file stored on a server, wherein the parent file is associated with one or more child files;
determining whether a first option is enabled that is associated with selecting a latest version or latest revision of a child file, wherein a version of a file corresponds to an iteration of the file and includes mete-data that is created when a modification of the file is saved to the server, and wherein a revision of a file comprises a plurality of versions of the file having a common label representing work performed to complete a change to the file that requires multiple modifications;
determining whether a second option is enabled, wherein the second option is associated with selecting a released version or released revision of a child file; and
for each child file, providing access to a version or revision of the child file based on whether the first option is enabled and whether the second option is enabled.

2. The method of claim 1, wherein providing access to a version or revision of a child file includes opening the child file or downloading the child file from the server.

3. The method of claim 1, wherein the parent file comprises an assembly file and the child files comprise sub-assembly files and/or part files.

4. The method of claim 1, wherein the first option is enabled and the second option is enabled, and wherein, for each child file, access is provided to the latest released version of the child file.

5. The method of claim 1, wherein the first option is enabled and the second option is disabled, and wherein, for each child file, access is provided to the latest version of the child file, regardless of whether the version is released.

6. The method of claim 1, wherein the first option is disabled, and further comprising the step of determining, for each child file, a revision number associated with the child file.

7. The method of claim 6, wherein the second option is disabled, and, for each child file, access is provided to the latest version of the child file within the revision number associated with the child file.

8. The method of claim 6, wherein the second option is enabled, and, for each child file, access is provided to the latest released version of the child file within the revision number associated with the child file.

9. The method of claim 1, wherein a version of a file is released when the version of the file is authenticated and/or authorized for use in another file.

10. A non-transitory computer-readable storage medium storing instructions that, when executed by a processor, cause a computer system to manage document revisions, by performing the steps of:
receiving a request to access a parent file stored on a server, wherein the parent file is associated with one or more child files;
determining whether a first option is enabled that is associated with selecting a latest version or latest revision of a child file, wherein a version of a file corresponds to an iteration of the file and includes mete-data that is created when a modification of the file is saved to the server, and wherein a revision of a file comprises a plurality of versions of the file having a common label representing work performed to complete a change to the file that requires multiple modifications;
determining whether a second option is enabled, wherein the second option is associated with selecting a released version or released revision of a child file; and
for each child file, providing access to a version or revision of the child file based on whether the first option is enabled and whether the second option is enabled.

11. The non-transitory computer-readable storage medium of claim 10, wherein providing access to a version or revision of a child file includes opening the child file or downloading the child file from the server.

12. The non-transitory computer-readable storage medium of claim 10, wherein the parent file comprises an assembly file and the child files comprise sub-assembly files and/or part files.

13. The non-transitory computer-readable storage medium of claim 10, wherein the first option is enabled and the second option is enabled, and wherein, for each child file, access is provided to the latest released version of the child file.

14. The non-transitory computer-readable storage medium of claim 10, wherein the first option is enabled and the second option is disabled, and wherein, for each child file, access is provided to the latest version of the child file, regardless of whether the version is released.

15. The non-transitory computer-readable storage medium of claim 10, wherein the first option is disabled, and further comprising the step of determining, for each child file, a revision number associated with the child file.

16. The non-transitory computer-readable storage medium of claim 15, wherein the second option is disabled, and, for each child file, access is provided to the latest version of the child file within the revision number associated with the child file.

17. The non-transitory computer-readable storage medium of claim 15, wherein the second option is enabled, and, for each child file, access is provided to the latest released version of the child file within the revision number associated with the child file.

18. The non-transitory computer-readable storage medium of claim 10, wherein a version of a file is released when the version of the file is authenticated and/or authorized for use in another file.

19. A computer system, comprising:
a processor configured to manage document revisions by performing the steps of:
receiving a request to access a parent file stored on a server, wherein the parent file is associated with one or more child files,
determining whether a first option is enabled that is associated with selecting a latest version or latest revision of a child file, wherein a version of a file corresponds to an iteration of the file and includes mete-data that is created when a modification of the file is saved to the server, and wherein a revision of a file comprises a plurality of versions of the file having a common label representing work performed to complete a change to the file that requires multiple modifications;

determining whether a second option is enabled, wherein the second option is associated with selecting a released version or revision of a child file, and for each child file, providing access to a version or revision of the child file based on whether the first option is enabled and whether the second option is enabled.

20. The computer system of claim 19, wherein the parent file comprises an assembly file and the child files comprise sub-assembly files and/or part files.

\* \* \* \* \*